US010064261B2

(12) United States Patent
Tao et al.

(10) Patent No.: US 10,064,261 B2
(45) Date of Patent: *Aug. 28, 2018

(54) EXTREME ULTRAVIOLET LIGHT SOURCE

(71) Applicant: ASML Netherlands B.V., Veldhoven (NL)

(72) Inventors: Yezheng Tao, San Diego, CA (US); John Tom Stewart, IV, San Diego, CA (US); Jordan Jur, San Diego, CA (US); Daniel Brown, San Diego, CA (US); Alexander A. Schafgans, San Diego, CA (US); Jason M. Arcand, Escondido, CA (US); Andrew LaForge, Poway, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,408

(22) Filed: Oct. 23, 2017

(65) Prior Publication Data

US 2018/0124906 A1  May 3, 2018

Related U.S. Application Data

(63) Continuation of application No. 15/148,255, filed on May 6, 2016, now Pat. No. 9,826,616, which is a continuation of application No. 14/325,153, filed on Jul. 7, 2014, now Pat. No. 9,357,625.

(51) Int. Cl.
*H05G 2/00* (2006.01)

(52) U.S. Cl.
CPC ............. *H05G 2/008* (2013.01); *H05G 2/006* (2013.01)

(58) Field of Classification Search
CPC ............................... H05G 2/006; H05G 2/008
See application file for complete search history.

(56) References Cited

U.S. PATENT DOCUMENTS

| 6,693,939 B2 | 2/2004 | Klene et al. |
| 6,973,164 B2 | 12/2005 | Hartlove et al. |
| 7,239,686 B2 | 7/2007 | Berglund et al. |
| 7,415,056 B2 | 8/2008 | Das et al. |

(Continued)

FOREIGN PATENT DOCUMENTS

WO    2011102277 A1    8/2011

OTHER PUBLICATIONS

Saleh et al., Laser Amplifiers, Fundamentals of Photonics, John Wiley & Sons, 1991, Chapter 13, 34 pages.

(Continued)

*Primary Examiner* — Jason McCormack
*Assistant Examiner* — Sean Luck
(74) *Attorney, Agent, or Firm* — DiBerardino McGovern IP Group LLC

(57) ABSTRACT

An initial pulse of radiation is generated; a section of the initial pulse of radiation is extracted to form a modified pulse of radiation, the modified pulse of radiation including a first portion and a second portion, the first portion being temporally connected to the second portion, and the first portion having a maximum energy that is less than a maximum energy of the second portion; the first portion of the modified pulse of radiation is interacted with a target material to form a modified target; and the second portion of the modified pulse of radiation is interacted with the modified target to generate plasma that emits extreme ultraviolet (EUV) light.

24 Claims, 14 Drawing Sheets

(56) References Cited

U.S. PATENT DOCUMENTS

| | | |
|---|---|---|
| 7,491,954 B2 | 2/2009 | Bykanov et al. |
| 7,608,846 B2 | 10/2009 | Nakano |
| 7,820,958 B2 | 10/2010 | Ishihara et al. |
| 7,876,498 B1 | 1/2011 | Honea et al. |
| 7,916,388 B2 | 3/2011 | Bykanov |
| 7,923,705 B2 | 4/2011 | Moriya et al. |
| 7,999,241 B2 | 8/2011 | Nagai et al. |
| 8,242,472 B2 | 8/2012 | Moriya et al. |
| 8,324,600 B2 | 12/2012 | Hayashi et al. |
| 8,680,495 B1 | 3/2014 | Tao et al. |
| 8,872,143 B2 | 10/2014 | Rafac et al. |
| 8,927,952 B2 | 1/2015 | Rafac et al. |
| 2003/0194055 A1 | 10/2003 | Mochizuki |
| 2004/0136417 A1 | 7/2004 | Webb et al. |
| 2005/0248829 A1 | 11/2005 | Sawin et al. |
| 2005/0258768 A1 | 11/2005 | Gaebel et al. |
| 2006/0215712 A1 | 9/2006 | Ziener et al. |
| 2006/0251217 A1 | 11/2006 | Kaertner et al. |
| 2006/0255298 A1 | 11/2006 | Bykanov et al. |
| 2007/0007469 A1 | 1/2007 | Murakami et al. |
| 2007/0291350 A1 | 12/2007 | Ershov et al. |
| 2008/0137696 A1 | 6/2008 | Zhang et al. |
| 2008/0179548 A1 | 7/2008 | Bykanov et al. |
| 2010/0051831 A1 | 3/2010 | Tao et al. |
| 2010/0181503 A1 | 7/2010 | Yanagida et al. |
| 2011/0007772 A1 | 1/2011 | Popmintchev et al. |
| 2011/0057126 A1 | 3/2011 | Hoshino et al. |
| 2011/0079736 A1 | 4/2011 | Hansson et al. |
| 2011/0122387 A1 | 5/2011 | Tao et al. |
| 2011/0220816 A1 | 9/2011 | Kakizaki et al. |
| 2011/0317256 A1 | 12/2011 | Hou et al. |
| 2012/0092746 A1 | 4/2012 | Hou et al. |
| 2012/0228525 A1 | 9/2012 | Moriya et al. |
| 2012/0229889 A1 | 9/2012 | Suganuma et al. |
| 2012/0235066 A1 | 9/2012 | Ershov |
| 2012/0241649 A1 | 9/2012 | Nishihara et al. |
| 2012/0243566 A1 | 9/2012 | Hori et al. |
| 2012/0305811 A1 | 12/2012 | Wakabayashi et al. |
| 2012/0307851 A1 | 12/2012 | Hori et al. |
| 2012/0313016 A1 | 12/2012 | Fleurov et al. |
| 2012/0319014 A1 | 12/2012 | Moriya et al. |
| 2013/0051412 A1 | 2/2013 | Miyao et al. |
| 2013/0146682 A1 | 6/2013 | Ishihara et al. |
| 2013/0148674 A1 | 6/2013 | Nowak et al. |
| 2013/0327963 A1 | 12/2013 | Lambert et al. |
| 2014/0264090 A1 | 9/2014 | Rafac et al. |
| 2016/0007434 A1 | 1/2016 | Tao et al. |
| 2016/0255708 A1 | 9/2016 | Tao et al. |

OTHER PUBLICATIONS

International Search Report and Written Opinion of the International Searching Authority for counterpart International Application No. PCT/US15/37799, dated Jan. 12, 2016, 14 pages.

Non-Final Office Action for parent U.S. Appl. No. 14/325,153, dated Jun. 25, 2015, 18 pages.

Non-Final Office Action for parent U.S. Appl. No. 15/148,255, dated Feb. 24, 2017, 30 pages.

First Office Action, counterpart Chinese Patent Application No. 201580036836.X, dated Jan. 17, 2018, 13 pages total (including English translation of 8 pages).

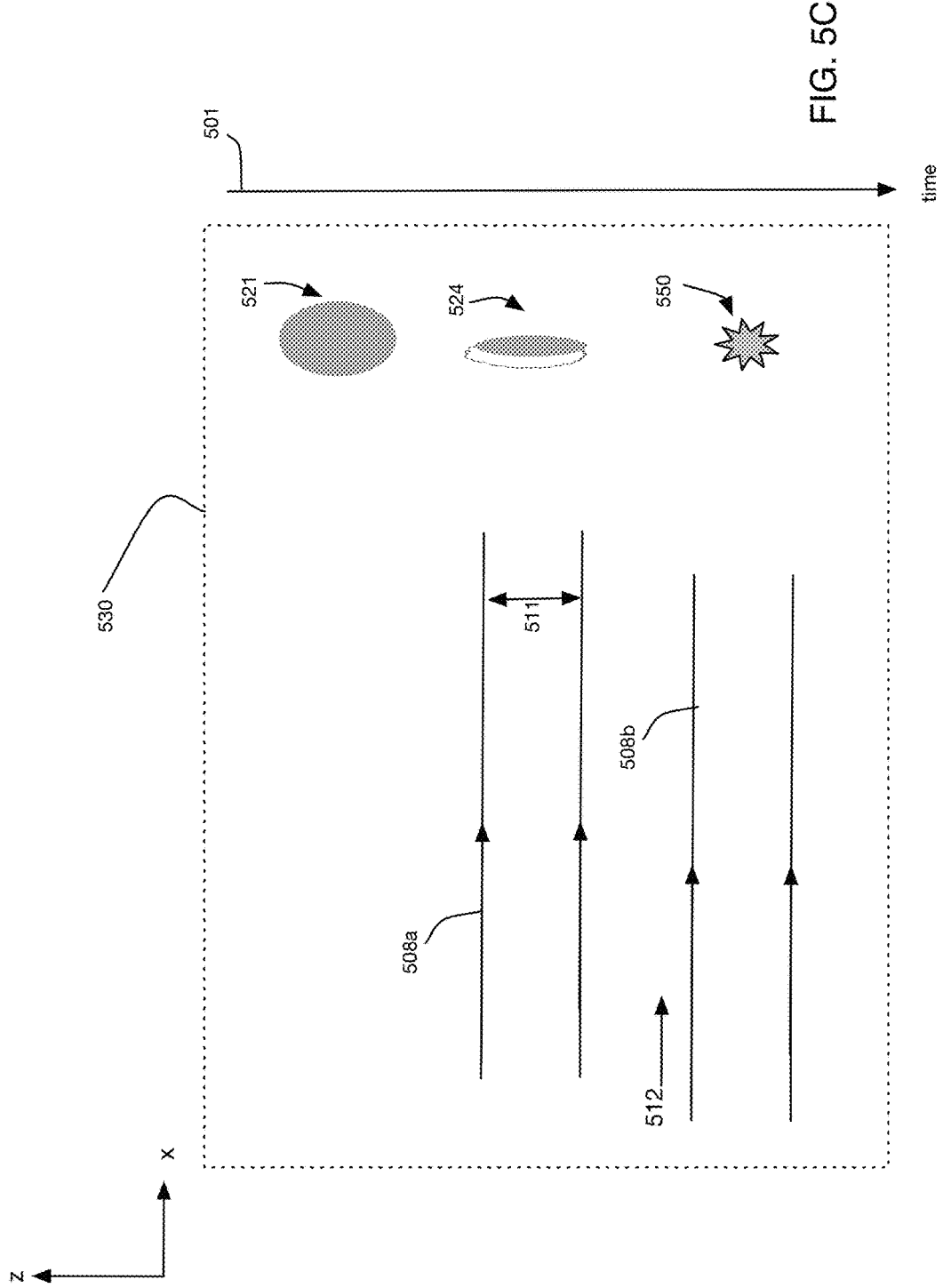

ns or less. The initial
EXTREME ULTRAVIOLET LIGHT SOURCE

CROSS-REFERENCE TO RELATED APPLICATIONS

This application is a continuation of U.S. patent application Ser. No. 15/148,255, filed May 6, 2016, now allowed, and titled EXTREME ULTRAVIOLET LIGHT SOURCE UTILIZING A TARGET OF FINITE EXTENT, which is a continuation of U.S. patent application Ser. No. 14/325,153, filed Jul. 7, 2014, now issued, and titled EXTREME ULTRAVIOLET LIGHT SOURCE. Both of these prior applications are incorporated herein by reference in their entirety.

TECHNICAL FIELD

The disclosed subject matter relates to an extreme ultraviolet light source.

BACKGROUND

Extreme ultraviolet ("EUV") light, for example, electromagnetic radiation having wavelengths of around 50 nm or less (also sometimes referred to as soft x-rays), and including light at a wavelength of about 13 nm, and less, for example, around 6.5 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In one general aspect, a method includes generating an initial pulse of radiation; extracting a section of the initial pulse of radiation to form a modified pulse of radiation, the modified pulse of radiation including a first portion and a second portion, the first portion being temporally connected to the second portion, and the first portion having a maximum energy that is less than a maximum energy of the second portion; interacting the first portion of the modified pulse of radiation with a target material to form a modified target; and interacting the second portion of the modified pulse of radiation with the modified target to generate plasma that emits extreme ultraviolet (EUV) light.

Implementations can include one or more of the following features. The modified pulse of radiation can be passed through a gain medium to form an amplified modified pulse of radiation, the gain medium amplifying the first portion of the modified pulse of radiation by a greater amount than the second portion of the modified pulse of radiation. The gain medium can have a small signal gain and a saturated gain, and the first portion of the modified pulse of radiation can be amplified by the small signal gain, and the second portion of the modified pulse of radiation can be amplified by the saturation gain.

Extracting a section of the initial pulse of radiation to form the modified pulse of radiation can include passing the initial pulse of radiation through a gating module. The gating module can include an electro-optic gating module. The electro-optic gating module can include an electro-optic modulator including one or more polarizers.

The initial pulse of radiation can include a pulse of light. The initial pulse of radiation can be pulse carbon dioxide ($CO_2$) laser light. The energy of the first portion of the modified pulse of radiation can increase continuously with time. The first portion of the modified pulse of radiation can have a duration of 50 nanoseconds (ns) or less. The initial pulse of radiation and the modified pulse of radiation can each be associated with a temporal profile that characterizes an energy as a function of time, and the temporal profiles of the initial pulse of radiation and the modified pulse of radiation can be different.

A target can be interacted with a first pulse of radiation to form the target material prior to interacting the first portion of the modified pulse of radiation with the target material. The first pulse of radiation can have a wavelength of 1 micron ($\mu$m).

In another general aspect, a method of generating extreme ultraviolet (EUV) light includes providing a target to a target location, the target being expanded spatially prior to reaching the target location; directing a pulse of radiation toward the target location, the pulse of radiation including a first portion and a second portion that reaches the target location after the first portion; interacting the first portion of the pulse of radiation with the target to form a modified target having a different absorption than the target; and interacting the second portion of the pulse of radiation with the modified target to generate plasma that emits EUV light.

Implementations can include one or more of the following features. The modified target having a different absorption than the target can include the modified target absorbing a greater amount of radiation than the target. The target includes a pre-expanded target, a spatial extent of the target being expanded in one dimension and reduced in a second dimension prior to being provided to the target location.

In another general aspect, an extreme ultraviolet (EUV) system includes a light source configured to emit a beam of light; a modulator configured to receive the beam of light emitted from the light source and to extract a portion of the beam of light; and an amplifier including a gain medium, the amplifier configured to receive the extracted portion of the beam of light and to amplify the extracted portion with the gain medium into a pulse including a first portion and a second portion, the first portion and second portion being temporally connected, the first portion being amplified by a greater amount than the second portion, and the second portion including an energy sufficient to convert target material that emits EUV light when in a plasma state to the plasma state, where, in use, a target is positionable in a target location that receives the pulse, the target including the target material that emits EUV light when in a plasma state.

Implementations can include one or more of the following features. The light source can include a source that produces laser light. The light source can be a pulsed carbon dioxide ($CO_2$) laser. The modulator can be configured to extract a portion of the beam of light by allowing only a portion of the beam of light to pass through the modulator.

The system also can include a second light source configured to produce a pulse of radiation including an energy sufficient to spatially expand a target material droplet to form the target that is positionable in the target location. The second light source can emit a pulse of laser light that including light having a wavelength of 1.06 microns (μm). The light source configured to emit the beam of light can be further configured to emit a pulse of laser light before emitting the beam of light, the pulse of laser light including an energy sufficient to spatially expand a target material droplet to form the target that is positionable in the target location.

Implementations of any of the techniques described above may include an EUV light source, a method, a process, a device, executable instructions stored on a computer readable medium, or an apparatus. The details of one or more implementations are set forth in the accompanying drawings and the description below. Other features will be apparent from the description and drawings, and from the claims.

DRAWING DESCRIPTION

Figure 5A:
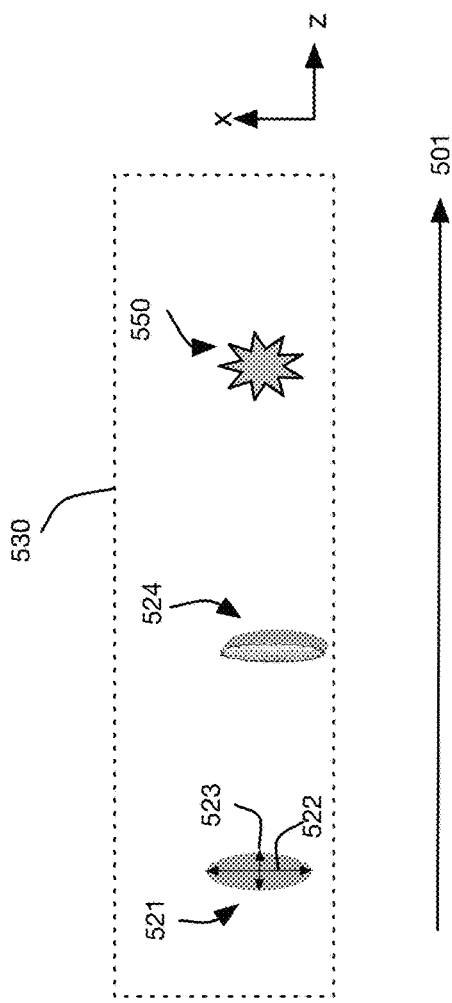
Figures 6A, 6B:
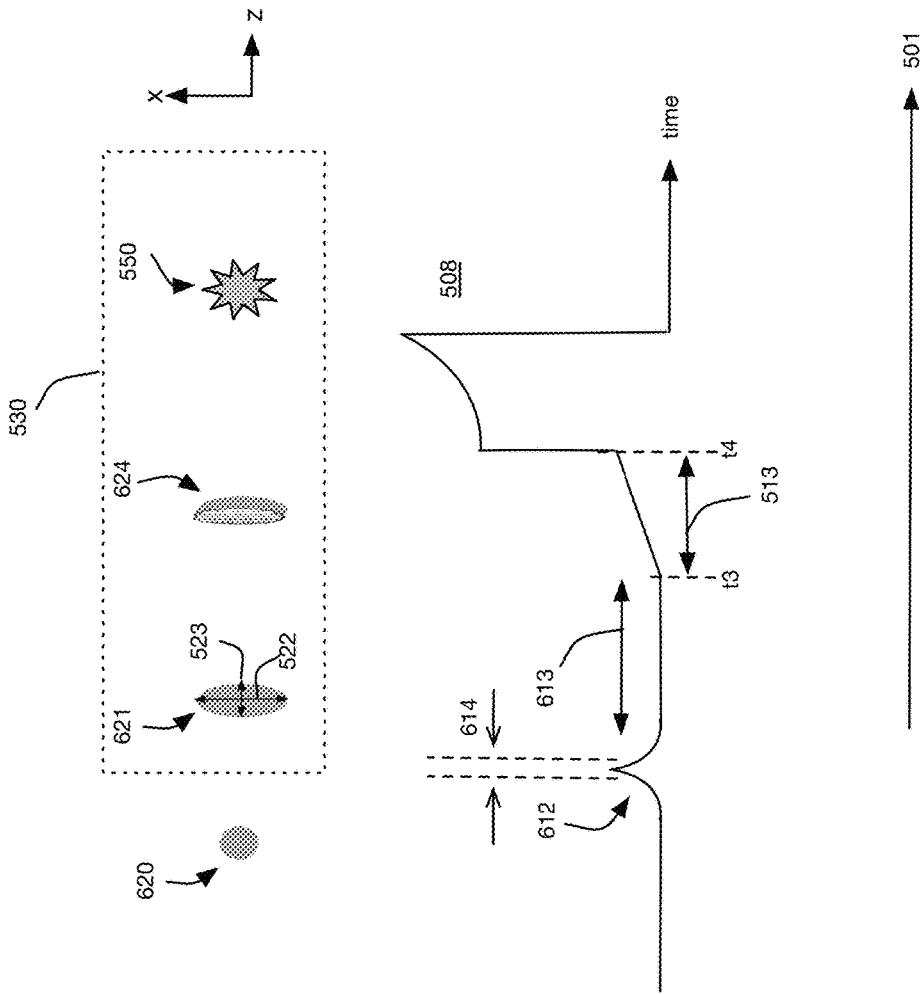

FIGS. 5A, 5C, and 6A show an exemplary target location over time.

Figure 5B:
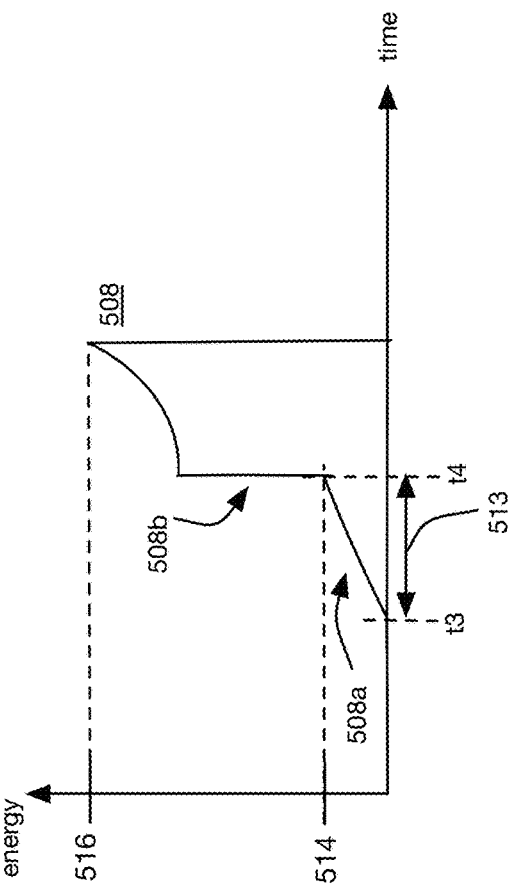

FIGS. 5B and 6B are plots of exemplary pulses of radiation.

Figure 7:
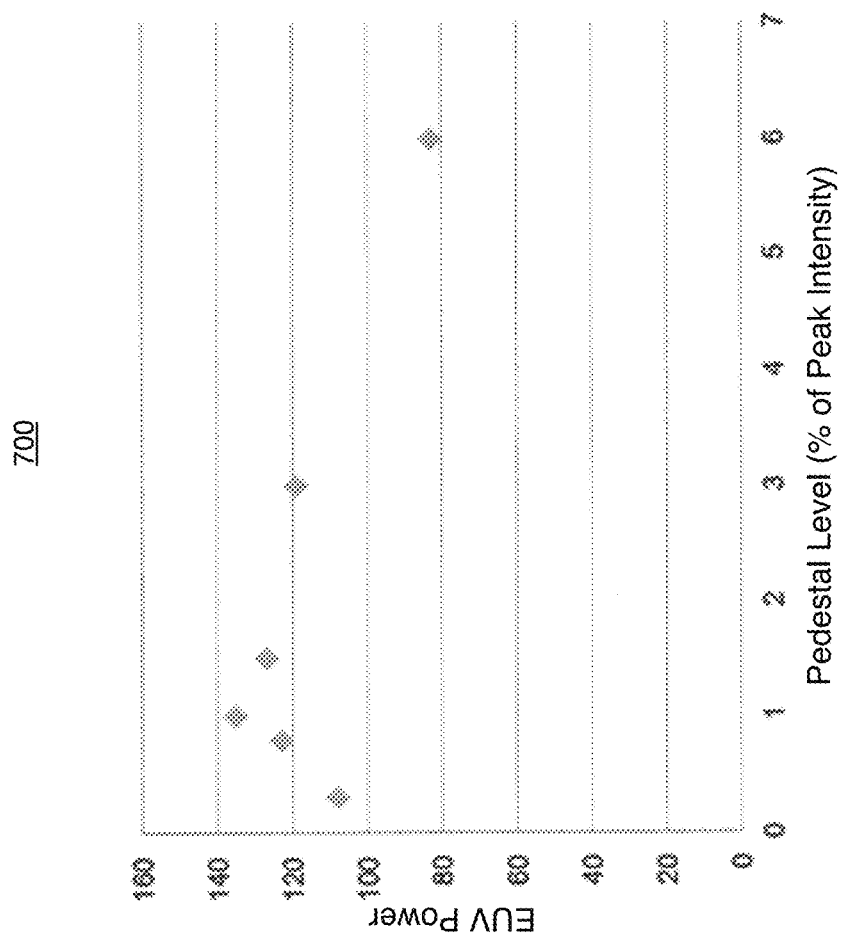

FIG. 7 is a plot of an exemplary relationship between EUV power and pedestal level.

Figure 8:
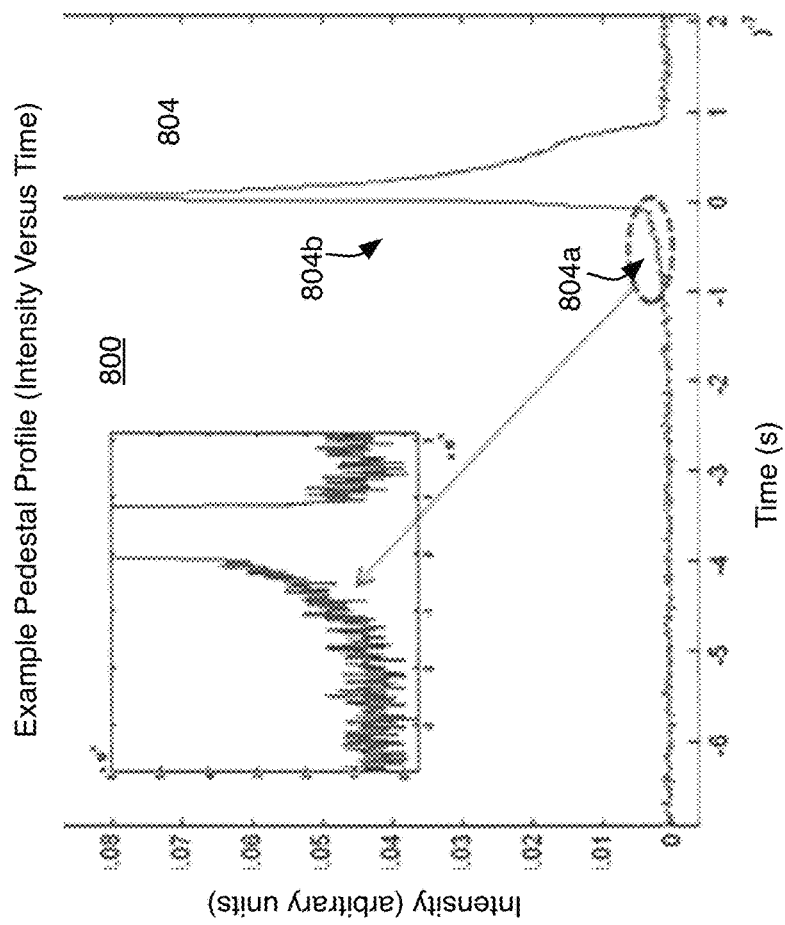

FIG. 8 is an exemplary measured pulse of radiation.

Figure 9:
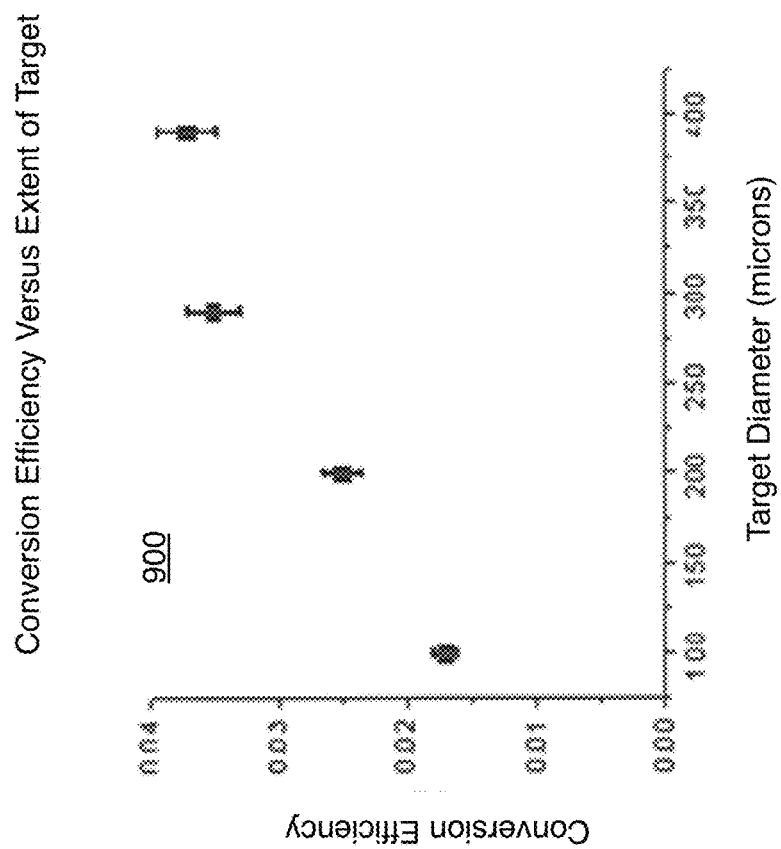

FIG. 9 is a plot of an exemplary relationship between conversion efficiency and target size.

FIGS. 10A-10D are exemplary shadowgraphs of a target location over time.

Figure 11:
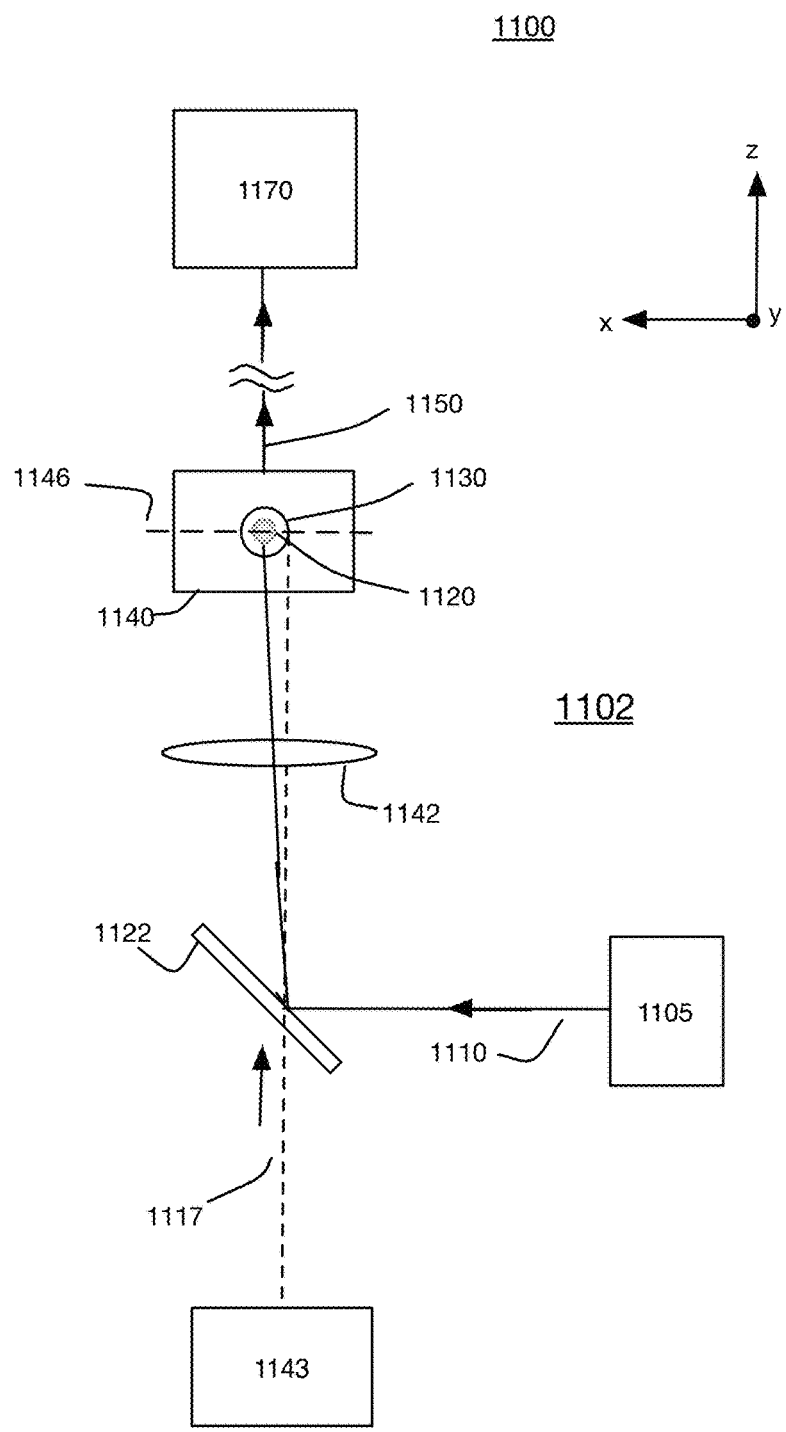

FIG. 11 is a top plan view of another laser produced plasma extreme ultraviolet (EUV) light source and a lithography tool coupled to the EUV light source.

Figure 12:
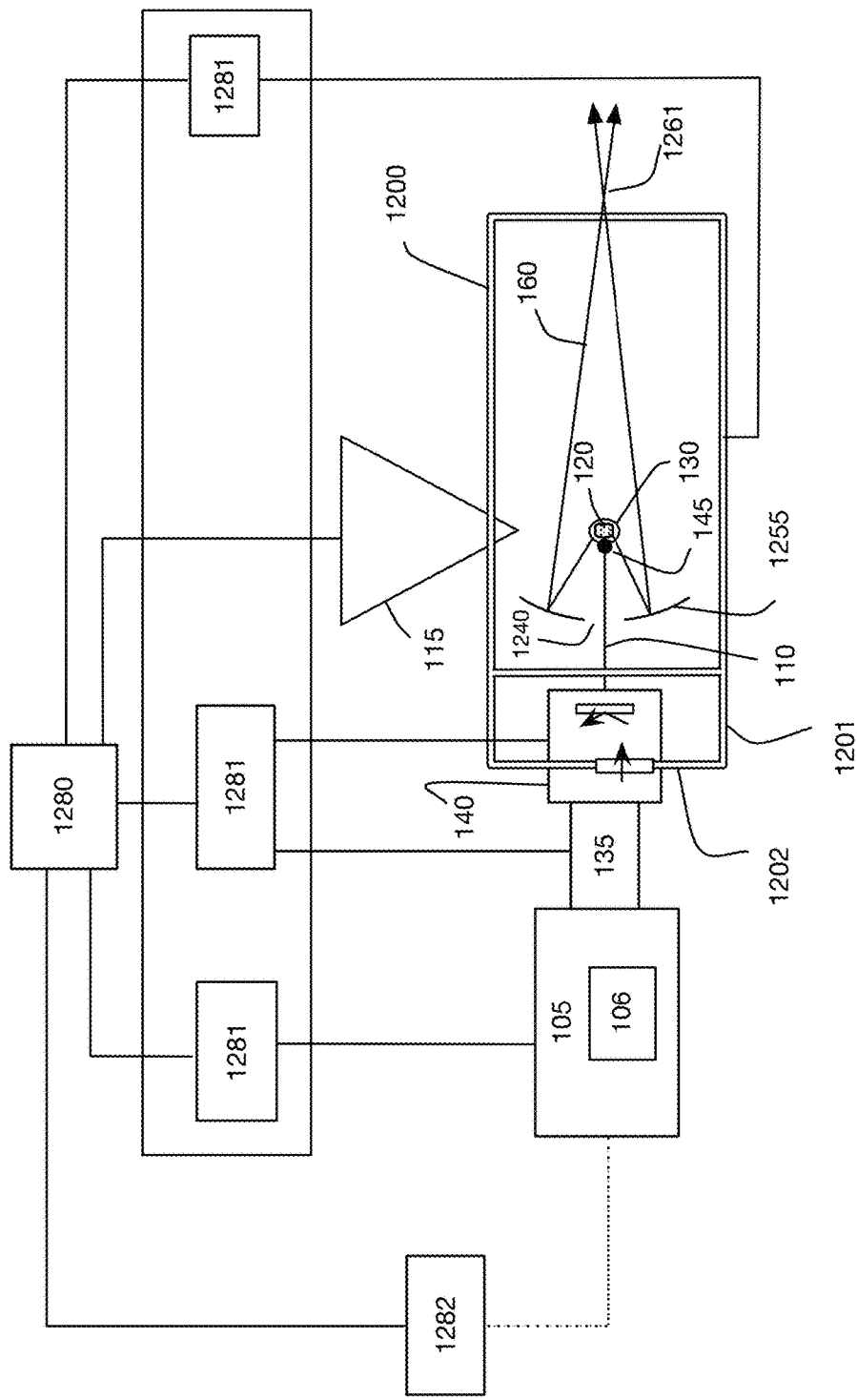

FIG. 12 is a block diagram of an exemplary laser produced plasma extreme ultraviolet light (EUV) source.

DETAILED DESCRIPTION

Techniques for conditioning a target are disclosed. The target includes target material that emits extreme ultraviolet (EUV) light when in a plasma state. As discussed in more detail below, the conditioning can enhance the ability of the target to absorb laser radiation and, therefore, can increase the conversion efficiency (CE) of an EUV light source that employs the conditioning technique.

The target is conditioned with a pulse of radiation that includes a first portion (a "pedestal") and a second portion (the main pulse or the heating pulse). The first and second portions are temporally connected to each other. In other words, the first portion and the second portion are part of a single pulse of radiation and there is no gap or region that lacks radiation between the first portion and the second portion.

The first portion of the pulse of radiation (or "pedestal") interacts with the target to modify the absorption characteristics of the target. For example, this interaction can modify the absorption characteristics by reducing the density gradient of the target and increasing volume of the target that interacts with the pulse of radiation at a surface that receives the pulse of radiation, which increases the amount of radiation that the target can absorb. In this manner, the interaction between the target and the first portion of the pulse of radiation conditions the target. The second portion of the pulse of radiation has an energy that is sufficient to convert target material in the target to plasma that emits EUV light. Because the conditioning by the first portion increases the amount of radiation that the target can absorb, the conditioning can result in a greater portion of the target being converted to plasma that emits EUV light. Additionally, the conditioning can reduce the reflectivity of the target, and, therefore, can reduce the amount of back reflections into an optical source that generates the pulse of radiation.

As discussed below, the characteristics of the pedestal, such as temporal duration and energy, can be controlled and varied to suit a particular target.

Figure 1:
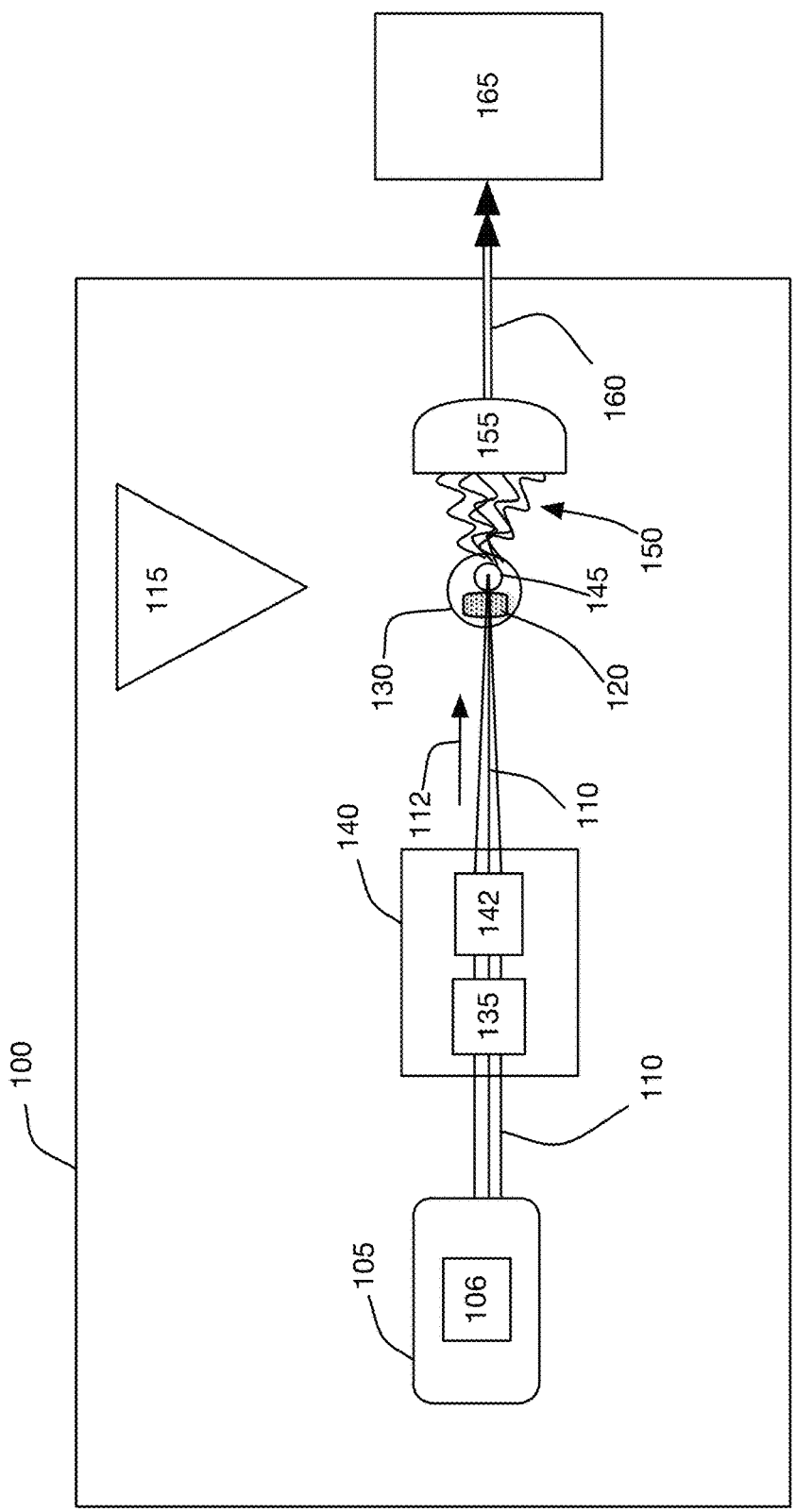
FIG. 1 is a block diagram of an exemplary laser produced plasma extreme ultraviolet light (EUV) source.

Referring to FIG. 1, an optical amplifier system 106 forms at least part of an optical source 105 (also referred to as a drive source or a drive laser) that is used to drive a laser produced plasma (LPP) extreme ultraviolet (EUV) light source 100. The optical amplifier system 106 includes at least one optical amplifier such that the optical source 105 produces an amplified light beam 110 that is provided to a target location 130. The target location 130 receives a target material 120, such as tin, from a target material supply system 115, and an interaction between the amplified light beam 110 and the target material 120 produces plasma that emits EUV light or radiation 150. A light collector 155 collects and directs the EUV light 150 as collected EUV light 160 toward an optical apparatus 165 such as a lithography tool.

The amplified light beam 110 is directed toward the target location 130 by a beam delivery system 140. The beam delivery system 140 can include optical components 135 and a focus assembly 142 that focuses the amplified light beam 110 in a focal region 145. The components 135 can include optical elements, such as lenses and/or mirrors, which direct the amplified light beam 110 by refraction and/or reflection. The components 135 also can include elements that control and/or move the components 135. For example, the components 135 can include actuators that are controllable to cause optical elements of the beam delivery system 140 to move.

The focus assembly 142 focuses the amplified light beam 110 so that the diameter of the beam 110 is at a minimum in the focal region 145. In other words, the focus assembly 142 causes the radiation in the amplified light beam 110 to converge as it propagates toward the focal region 145 in a direction 112. In the absence of a target, the radiation in the amplified light beam 110 diverges as the beam 110 propagates away from the focal region 145 in the direction 112.

As discussed below, the optical source 105 produces a pulse that has a first portion and a second portion that are temporally connected. The first portion can be referred to as a "pedestal." The first portion conditions the target material 120 to more readily absorb the second portion of the pulse. The second portion of the pulse has an energy that is sufficient to convert target material to plasma that emits EUV light.

Additionally, the spatial distribution of the target material 120 can be modified to increase the size of the target material 120 in a direction that intersects the amplified light beam 110 before the first portion of the pulse interacts with the target material 120. For example, the target material 120 can be expanded from a droplet into a flat disk with a separate pulse of radiation (a "pre-pulse") that interacts with the target material 120 before the first and second portions. Increasing the size of the target material 120 prior to the interaction with the amplified light beam 110 can increase the portion of the target material 120 that is exposed to the amplified light beam 110, which can increase the amount of EUV light that is produced for a given amount of target material 120 (due to the increased target material volume, which can absorb the pulse of radiation more efficiently and the larger EUV emitting volume, which can generate an increased amount of EUV light).

Figure 2:
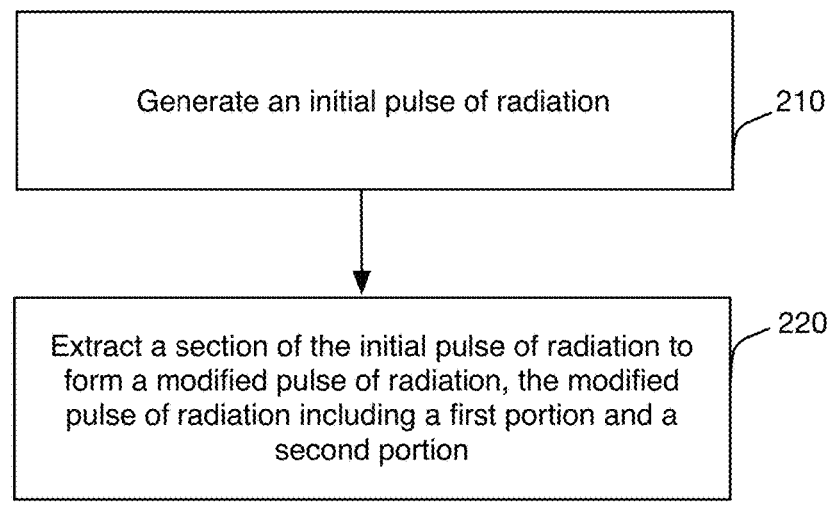
FIG. 2 is a flow chart of an exemplary process for producing a pulse of radiation.

Referring to FIG. 2, a flow chart for an exemplary process 200 is shown. The process 200 can produce a pulse of radiation that can be used as the amplified light beam 110 in the EUV light source 100 of FIG. 1 or any other EUV light source. The process 200 is discussed with reference to FIGS. 3A-3C.

An initial pulse of radiation is generated (210). A section of the initial pulse of radiation is extracted to form a modified pulse of radiation, the modified portion of radiation including a first portion (a "pedestal") and a second portion (220). The first portion and the second portion are temporally connected without an intervening region that lacks radiation.

Figure 3A:
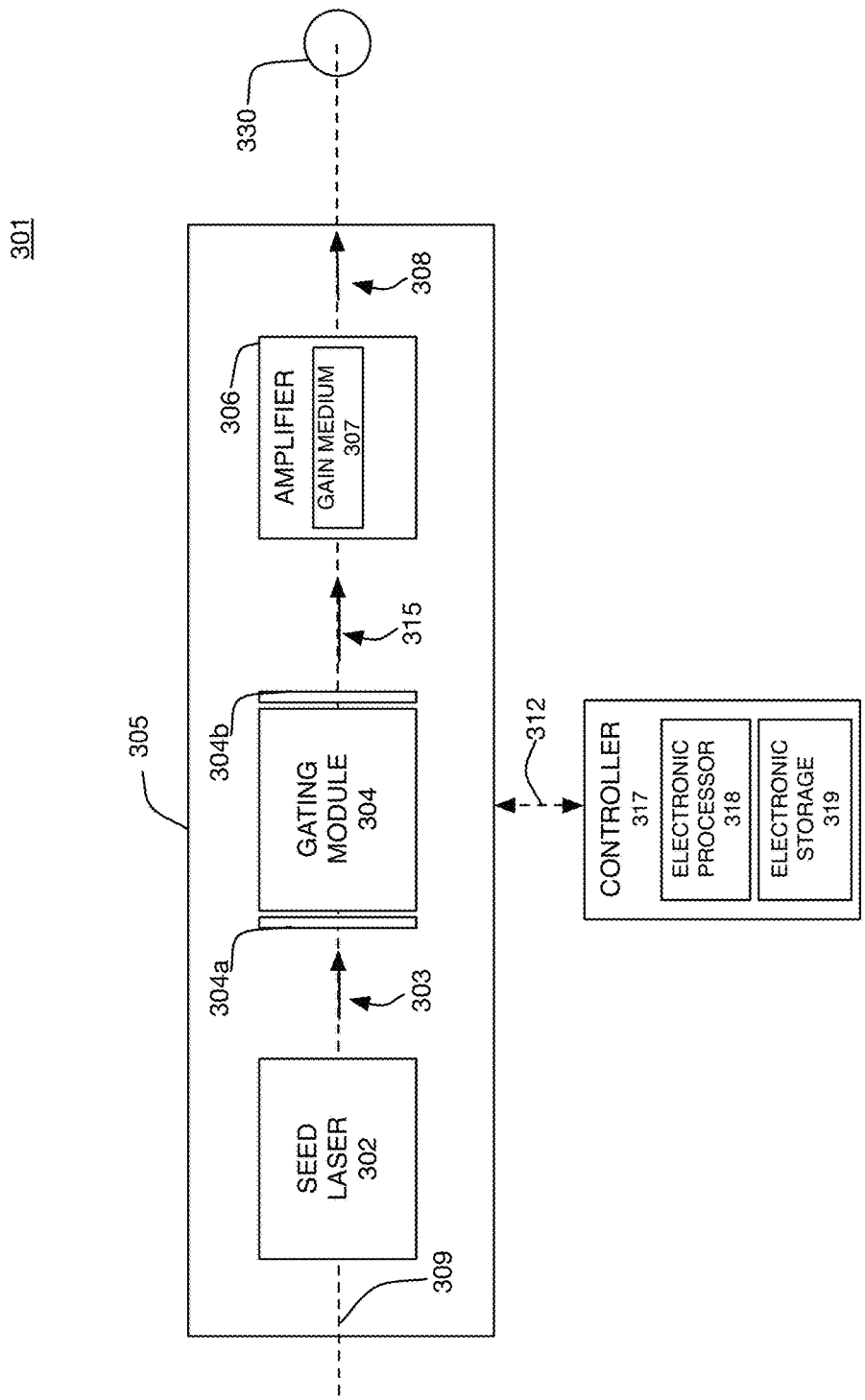
FIG. 3A is a block diagram of an exemplary optical system for a EUV light source.

Referring also to FIG. 3A, a block diagram of an exemplary system 301 that can perform the process 200 is shown. The system 301 includes an optical source 305. The optical source 305 or the system 301 can be used in the EUV light source instead of the optical source 105. The optical source 305 includes a seed laser 302, a gating module 304, and an optical amplifier 306. The amplifier 306 includes a gain medium 307. The optical source 305, the gating module 304, the amplifier 306, and the gain medium 307 are positioned on a beam path 309 along which light propagates. The beam path 309 intersects a target location 330 that receives a target that includes target material.

Figure 3B:
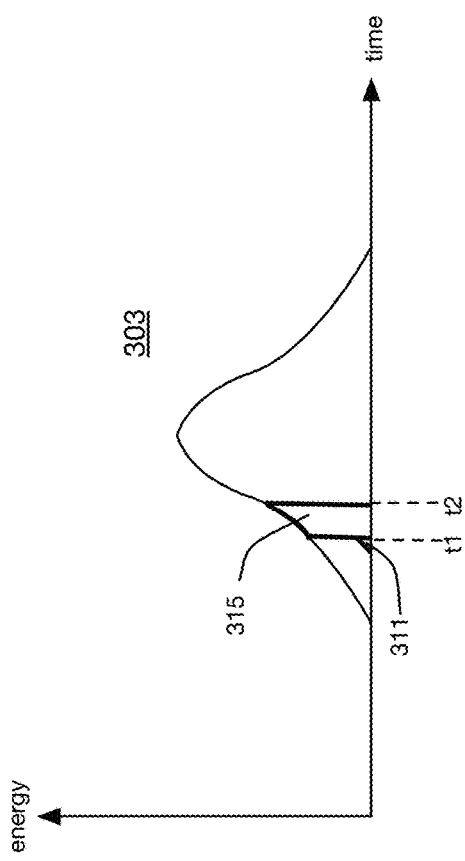
FIG. 3B is a plot of an exemplary pulse emitted from a seed laser.

The seed laser 302 can be, for example, a carbon dioxide ($CO_2$) laser that produces an amplified light beam 303 and emits the beam 303 onto the beam path 309 toward the gating module 304. FIG. 3B shows an example pulse shape (energy versus time) of the beam 303. The pulse shape of the beam 303 shown in FIG. 3B is for illustrative purposes, and the beam 303 can have other pulse shapes. Referring again to FIG. 3A, the seed laser 302 can be, for example, a master oscillator power amplifier (MOPA) $CO_2$ laser that emits laser pulses. In some implementations, the seed laser 302 can be a laser that emits light having a wavelength of 1 micron ($\mu$m), such as, for example neodymium-doped yttrium aluminum garnet (Nd:YAG) laser. The gating module 304 acts as a switch or filter that allows only a portion of the beam 303 to pass. For example, the gating module 304 can include an electro-optical gating module that cuts the beam of 303 into pulses.

In some implementations, the gating module 304 includes polarizers 304a and 304b that are positioned on the path 309. The polarizers 304a and 304b can be, for example linear polarizers that, when oriented with their transmission axes perpendicular to each other, prevent light from emerging from the gating module 304. In this example, when the polarizers 304a and 304b are aligned with their transmission axes parallel to each other and to the polarization of the beam 303, light passes through the gating module 304. Thus, by controlling the relative orientations of the polarizers 304a and 304b, the gating module 304 can selectively pass or block the beam 303 to extract a particular portion of the beam 303. In this manner, the gating module 304 extracts a portion of the beam 303 to form a modified pulse 315. Additionally, due to the finite amount of time in which the gating module 304 changes from a state that passes light to a state that blocks light, a small amount of leakage light can be present on either or both sides of the modified pulse 315.

The system 301 also includes a controller 317. The optical source 305 communicates with the controller 317 through a link 312. The controller 317 includes an electronic processor 318 and an electronic storage 319. The electronic storage 319 may be volatile memory, such as RAM. In some implementations, the electronic storage 319 may include both non-volatile and volatile portions or components. The processor 318 may be one or more processors suitable for the execution of a computer program such as a general or special purpose microprocessor, and any one or more processors of any kind of digital computer. An electronic processor receives instructions and data from a read-only memory or a random access memory or both. The electronic processor 318 can be any type of electronic processor and can be more than one electronic processor.

The electronic storage 319 stores instructions, perhaps as a computer program, that, when executed, cause the processor 318 to communicate with the optical source 305 and/or its components. For example, the instructions can be instructions that generate signals that drive actuators to position the polarizers 304a and 304b relative to each other to cause the gating module 304 to block or transmit light. In other words, the controller 317 can be programmed or set to cause a particular portion of the beam 303 to be extracted.

Referring also to FIG. 3B, exemplary temporal profiles (intensity vs. time) of the beam 303 emitted from the seed laser 302 and the modified pulse 315 emitted from the gating module 304 are shown. The modified pulse 315 is a portion of the beam 303.

In the example of FIG. 3B, the beam 303 is a pulse of laser light with a temporal profile that is approximately Gaussian. The beam 303 is passed to the gating module 304 to form the modified pulse 315. The gating module 304 can be controlled to select or extract a particular portion of the beam 303. In the example of FIG. 3B, at a time t=t1, the gating module 304 is set to emit light and at the time t=t2, the gating module 304 is set to block light. As a result, the modified pulse 315 is the portion of the beam 303 between the times t1 and t2 and has a temporal profile approximately equal to that of the beam 303 between the times t1 and t2. However, because the gating module 304 switches between passing and/or blocking light in a finite amount of time, a leakage light 311 is present at the leading edge of the modified pulse 315 (the time t=t1). The amount of leakage light 311 can be determined by the switching time of the gating module 304. In some implementations, the gating module 304 cuts the beam 303 into pulses with sharp slopes (nearly instant transition from blocking the beam 303 to passing the beam 303) with pulse durations of 50-250 nanoseconds (ns).

In other examples, the gating module 304 can extract a different portion of the beam 303. For example, the gating module 304 can be activated to pass light for a longer period of time to produce a modified pulse 315 that has a longer duration. Additionally or alternatively, the gating module 304 can be activated at a different time to capture a portion of the beam 303 that has a different temporal intensity profile than the portion extracted in the example of FIG. 3B. Selectively capturing a particular portion of the beam 303 allows the energy or intensity of the modified pulse 315 to be controlled. For example, activating the gating module 304 while the beam 303 is at its peak energy results in a modified pulse 315 with a greater energy than a modified pulse that is generated from activating the gating module 304 while the beam 303 is at a lower energy.

Referring again to FIG. 3A, the modified pulse 315 is input to the amplifier 306, and the amplifier 306 produces an amplified modified pulse 308. The optical amplifier 306 includes the gain medium 307, which receives energy through pumping and provides the energy to the modified pulse 315 and amplifies the modified pulse 315 into the amplified modified pulse 308.

The amount of amplification of the modified pulse 315 is determined by the gain of the amplifier 306 and the gain medium 307. The gain is an amount or factor of increase in energy that the amplifier 306 provides to an input light beam. The optical amplifier 306 has a "small-signal gain" and a "saturated gain," and the gain that a light beam incident on the optical amplifier 306 sees depends on the energy of the light beam. For light beams that have relatively low energy, the gain of the optical amplifier 306 is linear, that is, the gain is the same regardless of the variations in the energy of the input signal. The gain in this regime is called the "small-signal gain." However, for sufficiently large energy or intensity light beams, the amplifier 306 can become saturated. Saturation is a form of non-linear behavior in which the energy of the light beam output by the amplifier is not proportionally increased compared to the input light beam. The gain of the amplifier 306 in saturation can be referred to as the "saturation gain." The saturation gain can be less than the small-signal gain. The small-signal gain of the optical amplifier 306 can be, for example, a factor of 100,000. In some implementations, the small-signal gain of the optical amplifier 306 can be a range, for example, a factor of $10^4$ to $10^7$.

As discussed above, when the gating module 304 forms the modified pulse 315, the leakage light 311 is present at the leading edge of the modified pulse 315. The leakage light 311 has a smaller energy than the other parts of the modified pulse 315. As a result, the leakage light 311 can be amplified by the small-signal gain of the gain medium 307, and the remaining portion of the modified pulse 315 can be amplified by the saturated gain. Thus, the leakage light 311 at the leading edge of the modified pulse 315 can be amplified by a greater factor than the remaining part of the modified pulse 315.

Figure 3C:
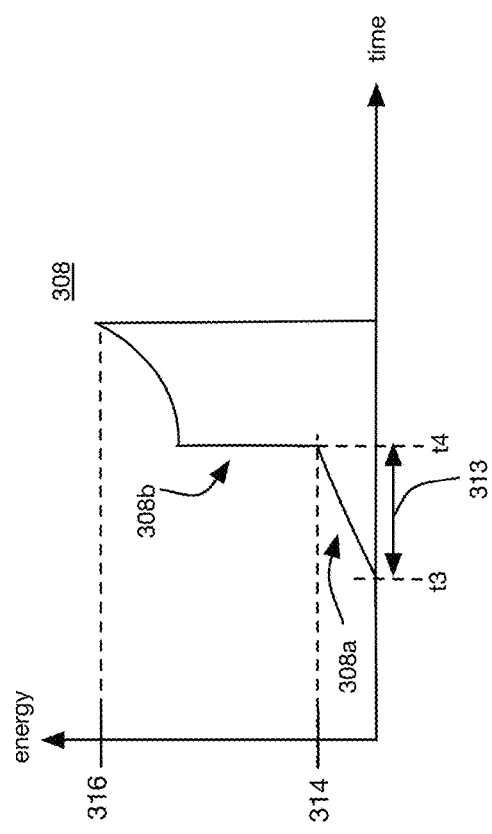
FIG. 3C is a plot of an exemplary pulse with a pedestal.

Referring also to FIG. 3C, a temporal profile (energy as a function of time) for an exemplary amplified modified pulse 308 is shown. The amplified modified pulse 308 includes a first portion 308a (the "pedestal") and a second portion 308b. The amplified modified pulse 308 is a single pulse, and the first and second portions 308a, 308b are temporally connected to each other without an intervening gap or region that lacks radiation.

The first portion 308a is formed from the amplification of the leakage light 311. The first portion 308a has a pedestal duration 313. The pedestal duration 313 is the length of time between the initiation of the modified pulse 308 (t=t3) and the beginning of the second portion 308b (t=t4). The first portion 308a also has a pedestal level 314. The pedestal level 314 is the maximum energy or maximum power of the first portion 308a over the duration 313. Although the example of FIG. 3C shows the pedestal level 314 as being immediately adjacent to the beginning of the second portion 308b, the level 314 can occur at any time during the duration 313. The second portion 308b has a peak energy 316 that is sufficient to convert the target material in a target to plasma that emits EUV light.

Figure 4:
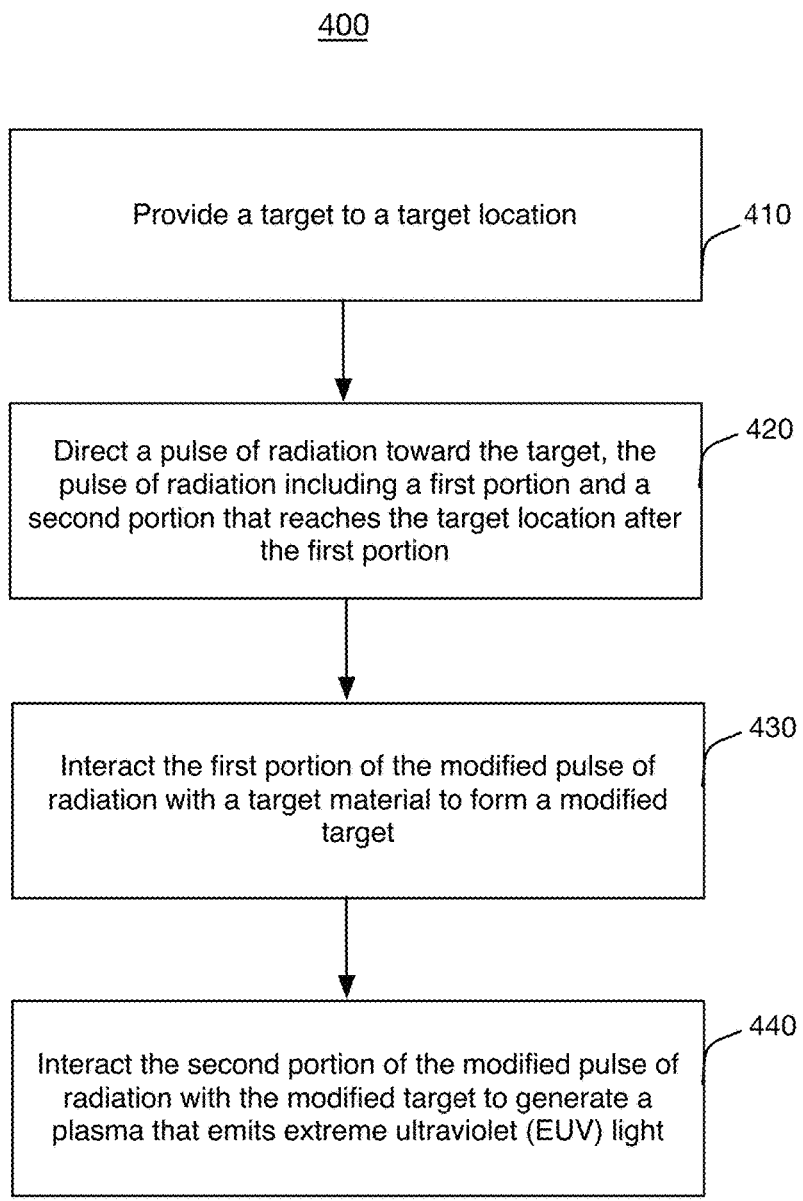
FIG. 4 is a flow chart of an exemplary process for generating EUV light.

Referring to FIG. 4, a flow chart of an exemplary process 400 is shown. The process 400 can be used to generate EUV light and can be performed, for example, with the EUV light source 100 and the system 301.

The process 400 is discussed with reference to FIGS. 5A-5C, which show an exemplary target location 530 over a time period 501. FIG. 5A shows changes in a geometric distribution of target material as the target material interacts with a pulse of radiation 508 over the time period 501. FIG. 5B is a temporal profile of the pulse of radiation 508. The pulse of radiation 508 includes a pedestal 508a and a second portion 508b that are temporally connected. A target 521 interacts with the pedestal 508a to form a modified target 524, and the second portion 508b irradiates the modified target 524 to convert the target material in the modified target 524 to plasma that emits EUV light 550. FIG. 5C shows exemplary beam widths of the pedestal 508a and a second portion 508b in the target location 530 during the time period 501. In the example shown, the pedestal 508a has a beam width of 511 in the target location 530.

Referring again to FIG. 4, the target 521 is provided to the target location 530 (410). The target location 530 is a region in space that receives a distribution of target material and an amplified light beam, which, in this example, is the pulse of radiation 508. The target location 530 can be similar to the target location 130 (FIG. 1) or the target location 330 (FIG. 3A).

The target 521 is a geometric distribution of target material that is not ionized (a material that is not a plasma). The target 521 can be, for example, a disk of liquid or molten metal, a droplet of liquid or molten metal, a continuous segment of target material that does not have voids or substantial gaps, a mist of micro- or nano-particles, or a cloud of atomic vapor. The size of the target 521 is characterized by an extent 522 along a first direction "x" and an extent 523 in a second direction "z" that is perpendicular to the first direction. The extent 523 is parallel to a direction of propagation 512 of the pulse of radiation 508.

In some implementations, the target 521 is an expanded target in which the extent 522 is greater than the extent 523. For example, the extent 522 can be 220 micrometers (μm), and the extent 523 can be 370 nanometers (nm). In another example, the extent 522 can be 300 μm and the extent 523 can be 200 nm. The extents 522 and 523 can also be larger, smaller, or between these example values. For example, the extent 522 can be between 30 μm and 500 μm. The extent 523 can be between 30 μm and 50 nm, with the extent 523 having a value at the larger end of the range (for example, 30 μm) when the target 521 is missed and at the smaller end of the range (for example, 50 nm) when the target 521 is flattened in a direction that is parallel to the direction of propagation 512.

Spatially expanding the target 521 can increase the amount of EUV light that is generated. First, because the extent 522 is greater than the extent 523, the expanded target presents a relatively large area to the pulse of radiation 508 in a direction that is perpendicular to the direction of propagation 512. This exposes more of the target material in the target 521 to the amplified light beam. Additionally, the expanded target can have relatively short extent along the direction of propagation 512, permitting the pulse of radiation 508 to reach deeper into the target and convert a higher portion of the target material to plasma.

Second, expanding the target spreads the target material spatially, thereby minimizing the occurrence of regions of excessively high material density during heating of the plasma by the second portion 508b. If the plasma density is high throughout a region that is irradiated with radiation, absorption of the radiation can be limited to the portions of the region that receive the radiation first. Heat generated by this initial absorption may be too distant from the bulk target material to maintain the process of evaporating and heating of the target material surface long enough to utilize (evaporate) a meaningful amount of the bulk target material during the finite duration of the second portion 508b. In instances where the region has a high electron density, the light pulse only penetrates a fraction of the way into the region before reaching a "critical surface" where the electron density is so high that the light pulse is reflected. The light pulse cannot travel into those portions of the region and little EUV light is generated from target material in those regions. The region of high plasma density can also block EUV light that is emitted from the portions of the region that do emit EUV light. Consequently, the total amount of EUV light that is emitted from the region is less than it would be if the region lacked the portions of high plasma density. As such, using an expanded target can result in the second portion 508b reaching more of the target material before being reflected. This can increase the amount of EUV light subsequently produced.

In some implementations that employ a spatially expanded target 521, and with reference to FIGS. 6A and 6B, the target is a pre-expanded target 621 that is a distribution of target material that is spatially expanded prior to reaching the target location 530 by interacting a pre-pulse 612 with a target material droplet 620. The target material droplet 620 can be, for example, a droplet of molten metal that is 17-35 µm in diameter that is part of a stream of droplets of molten metal released from a system, such as the target material supply system 115 (FIG. 1). The force of the impact of the first pre-pulse 612 on the droplet 620 deforms the droplet 620 into a shape that is closer to a disk that expands, after about 1-3 microseconds (µs), into a disk-shaped piece of molten metal.

The pre-pulse 612 has a duration 614 and is separated in time from the pulse of radiation 508 by a delay time 613, with the pre-pulse 612 occurring before the pulse of radiation 508. The duration 614 can be measured using a suitable metric such as a foot-to-foot duration or the full width at half max (FWHM). The duration 614 can be, for example, 20-70 ns, less than 1 ns, 300 picoseconds (ps) or less, 100 ps or less, 100-300 ps, or 10-100 ps. The wavelength of the pre-pulse 612 can be, for example, 1.06 µm or 10.6 µm. The pre-pulse 612 can have an energy of, for example, 3-60 milliJoules (mJ). The pre-pulse 612 can be generated by a secondary source that is identical to the source that generates the pulse of radiation 508 or by a source that is separate from the source that generates the pulse of radiation 508 and is also different from that source.

The example of generating an expanded target using a pre-pulse is one way of providing an expanded target. However, implementations in which the target 521 is an expanded target can involve other techniques. For example, the target 521 can be expanded in the course of falling from a target material supply system (such as the system 115 of FIG. 1) to the target location 530 without interaction with a pre-pulse. In another example, the target 521 can be a pre-formed or machined target formed prior to reaching the target location. In some implementations, the target 521 is not an expanded target.

Referring again to FIG. 4, the pulse of radiation 508 is directed toward the target 521 to form the modified target 524 (420). The pulse of radiation 508 can be formed by the process 200, discussed above with respect to FIGS. 2 and 3A-3C.

The pulse of radiation 508 includes the first portion 508a (a "pedestal") and the second portion 508b, which reaches the target location 530 after the first portion 508a. The pulse of radiation 508 is a single pulse, and there is no gap or temporal separation between the first portion 508a and the second portion 508b. The first portion 508a has a duration 513 and a level 514. The duration 513 is the amount of time between the beginning of the pulse of radiation 508 and the beginning of the second portion 508b. The duration can be, for example, 10-150 ns. The energy of the pedestal 508a can vary over the duration 513. The level 514 is a maximum or average energy of the pedestal 508a. The level 514 can be, for example, 1-4 mJ. In some examples, the level 514 is expressed as a percentage of a peak (maximum) energy 516 of the second portion 508b. For example, the level 514 can be 1-10% of the peak energy 516 of the second portion 508b.

As discussed with respect to FIG. 3A, the pedestal level 514 and the duration 513 are set when the pedestal 508a is generated through selective activation of the gating module 304. The optimal values for the pedestal duration 513 and level 514 depend on the spatial characteristics of the target 521. For example, the target 521 can be a relatively thick target with an extent 522 between about 200 µm and 220 µm, and an extent 523 between about 400 µm and 370 nm. In some implementations, a thick target has an extent 523 of greater than 350 nm, and a thin target has an extent 523 of less than 200 nm. For a relatively thick target, the amount of EUV light produced increases as the pedestal level 514 decreases. For such a target, the duration 513 of the pedestal 508a can be set to, for example, 150 ns or less, and the pedestal level 514 can be set to have an energy of 1-3 mJ. In another example, the target 521 can be a relatively thin target with the extent 522 being 300 µm, and the extent 523 being 200 nm. In this example, the pedestal level 514 can be set to 5 mJ, and the duration 513 can be 50-150 ns. In this example, the level 514 can be can be about 1% of the maximum energy of the second portion 508b.

Referring again to FIG. 4, the pedestal 508a interacts with the target 521 to form the modified target 524 (430). The pedestal 508a impinges on the target 521 to form the modified target 524. The modified target 524 can take many forms. For example, the modified target 524 can be a pre-plasma that is spatially near to a bulk target material and formed as the pedestal 508a interacts with the metal in the modified target 524. A pre-plasma is a plasma that is used to enhance absorption of incident light. Although the pre-plasma can emit small amounts of EUV light in some instances, the EUV light that is emitted is not of the wavelength or amount that is emitted by converting the target material in the modified target 524 to plasma. In some implementations, the modified target 524 is a volume of fragments or a mist of target material. The force of the pedestal 508a interacting with the target 521 can cause all or portions of the target 521 to break apart, forming the mist or volume of fragments.

The modified target 524 has different properties than the target 521. For example, the density of the modified target 524 can be different from that of the target 521. The density of at least a portion of the modified target 524 can be less than the density of the target 521. Additionally or alternatively, the geometric distribution of the modified target 524 can be different than that of the target 521. For example, the modified target 524 can be larger than the target 521 in one or more dimensions.

The second portion 508b of the pulse of radiation 508 interacts with the modified target 524 to generate EUV light 550 (340). The second portion 508b has an energy that is sufficient to convert the target material in the modified target 524 to plasma that emits EUV light.

FIGS. 7, 9, and 10A-10D show exemplary measured data resulting from interacting a target with a pulse of radiation that includes a pedestal, and FIG. 8 shows an exemplary measured pulse of radiation that includes a pedestal.

Referring to FIG. 7, a plot 700 shows an example of a measured relationship between EUV power and pedestal level for a target having a diameter of 300 μm and a thickness of 200 nm. The diameter is measured along a direction that is perpendicular to a direction of propagation of an irradiating beam of radiation, and the thickness is measured along a direction that is parallel to the direction of propagation.

As discussed above, the optimal pedestal level can depend on the characteristics of the target. In the example shown in FIG. 7, the target had a thickness of 200 nm, and EUV power was measured as the pedestal level was varied. The produced EUV power was highest for a pedestal level between 1-2% of the peak intensity of the heating portion of the pulse of radiation. The heating portion of the pulse of radiation is the portion of the pulse that has sufficient energy to convert the target material to plasma, such as the second portion 508b. In the example shown in FIG. 7, the optimal pedestal level (the level that produced the most EUV) was about 4 mJ.

Referring to FIG. 8, a plot 800 shows an exemplary measured waveform of a $CO_2$ laser pulse 804 that includes a pedestal 804a and a second portion 804b. The pedestal 804a conditions a target (not shown) and can be generated by a process such as the process 200 discussed with respect to FIG. 2. The example pulse 804 is optimized for a target that was expanded to 350 μm from a 35 μm diameter droplet of molten tin. As compared to the example of FIG. 7, the target of the example of FIG. 8 has a larger diameter. For this target, the optimal pedestal level is larger, as shown in FIG. 8. The optimal pedestal level was 3% of the peak power of the second portion 804b, pedestal level was 10 mJ and the duration was 100 ns.

Referring to FIG. 9, a plot 900 shows exemplary measured conversion efficiency (CE) as a function of target diameter. The target diameter is a diameter of an expanded target along a direction that is perpendicular to a direction of propagation of an irradiating beam of radiation. As shown, CE is greater than or equal to 3.5% when the diameter of the expanded target is greater than 300 μm.

Referring to FIGS. 10A-10D, exemplary measured shadowgraphs of an expanded target 1021 taken at various times with respect to the time of arrival of a main pulse are shown. The target 1021 is an expanded target with an extent 1022 along a direction that is parallel to a direction" and an extent 1023 that is parallel to a direction "z." The extent 1022 is perpendicular to the direction "z", and the extent 1022 is greater than the extent 1023.

The target 1021 is in a target location that receives a pulse of radiation (not shown) that propagates in a direction that is parallel to the "z" direction. The pulse of radiation includes a pedestal and a second portion (or main pulse) that arrives in the target location after the pedestal. The second portion of the pulse of radiation has an energy sufficient to convert target material in the expanded target to plasma that emits EUV light.

Figures 10A, 10B, 10C, 10D:
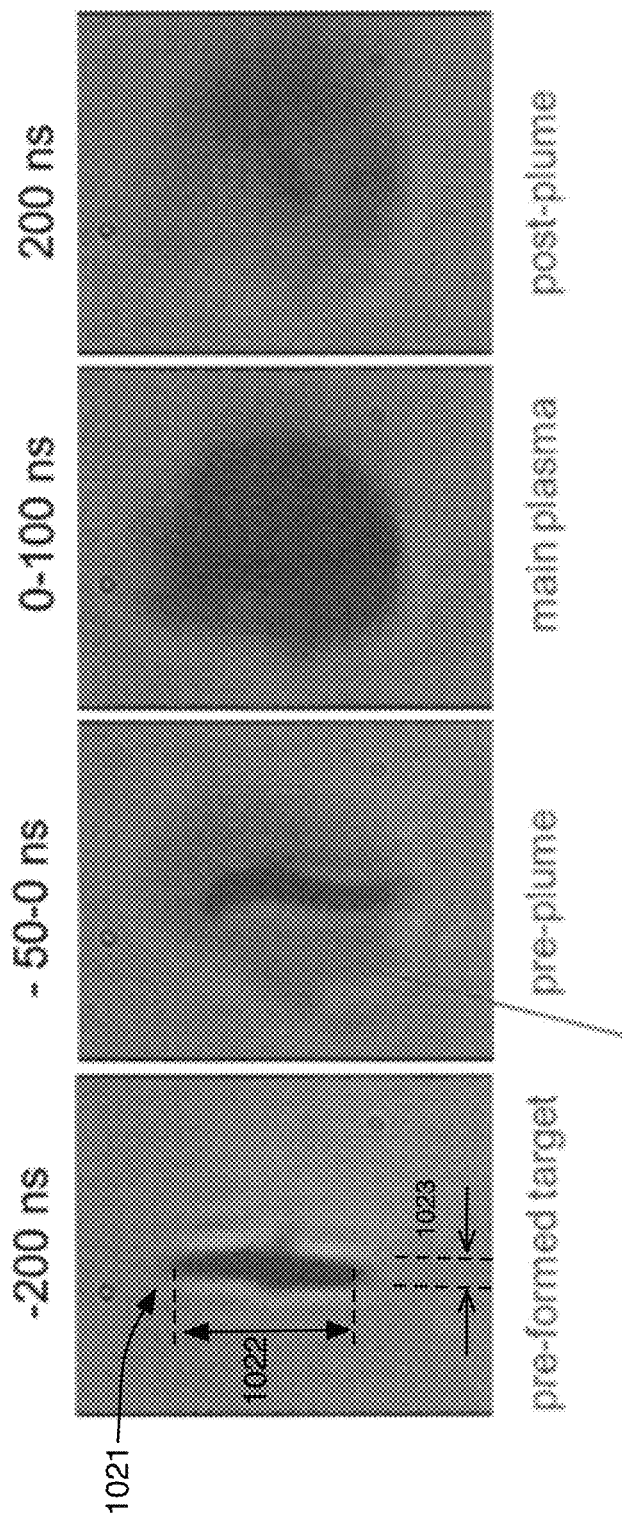

FIG. 10A shows a pre-expanded target 1021 at a time that is 200 ns prior to the beginning of the second portion of the pulse of radiation. FIG. 10B shows the target 1021 at a time between 0-50 ns before the beginning of the second portion, and while the pedestal interacts with the target 1021. The interaction between the pedestal and the target 1021 forms a low-density plume 1005 in the vicinity of the target 1021. The pedestal can make two modifications to the target 1021. First, the pedestal can cause homogenization of a lateral and/or longitudinal density profile of the target 1021 by generating the low-density plume 1005. This can make the target density more uniform locally, resulting in a locally smoothed target. Second, the interaction between the pedestal and the target 1021 forms a more gentle plasma density scale length along the radiation incident line (the direction "z"). The gentle plasma density scale length is shown in FIG. 10B in the plume 1005. The relatively uniform density profile of the expanded target can allow the main pulse to penetrate the target more efficiently, interacting with a higher portion of the target material and converting a higher portion of the target material to plasma. Thus, the conversion efficiency (CE) can be higher. The gentle plasma density profile can result in a larger plasma volume that includes more atoms or particles of the target material. This can lead to higher radiation absorption due to a longer plasma scale length, and more EUV light. Further, the gentle plasma density profile results in a less reflective surface and can reduce reflection of the main pulse back into the light source that generated the main pulse.

FIG. 10C shows the target 1021 during a time when the main pulse strikes, with the target material in the target being converted into plasma and EUV light. FIG. 10D shows a post-plume that remains 200 ns after the arrival of the main pulse.

FIGS. 11 and 12 provide additional information about a system that can generate a pulse of radiation that includes a pedestal.

Referring to FIG. 11, a top plan view of an exemplary optical imaging system 1100 is shown. The optical imaging system 1100 includes an LPP EUV light source 1102 that provides EUV light 1150 to a lithography tool 1170. The light source 1102 can be similar to, and/or include some or all of the components of, the light source 100 of FIG. 1.

The system 1100 includes an optical source such as a drive laser system 1105, an optical element 1122, a pre-pulse source 1143, a focusing assembly 1142, and a vacuum chamber 1140. The drive laser system 1105 produces an amplified light beam 1110. The amplified light beam 1110 includes a pedestal portion and second portion, similar to, for example, the pulses of radiation 308 and 508 discussed above. The amplified light beam 1110 has energy sufficient to convert target material in a target 1120 into plasma that emits EUV light. Any of the targets discussed above can be used as the target 1120.

The pre-pulse source 1143 emits pulses of radiation 1117. The pulses of radiation can be used as the pre-pulse 806 (FIG. 8A-8C, FIG. 10) or as the pre-pulses 806 and/or 807 (FIGS. 9A-9C). The pre-pulse source 1143 can be, for example, a Q-switched Nd:YAG laser that operates at a 50 kHz repetition rate, and the pulses of radiation 1117 can be pulses from the Nd:YAG laser that have a wavelength of 1.06 μm. The repetition rate of the pre-pulse source 1143 indicates how often the pre-pulse source 1143 produces a pulse of radiation. For the example where the pre-pulse source 1143 has a 50 kHz repetition rate, a pulse of radiation 1117 is emitted every 20 microseconds (μs).

Other sources can be used as the pre-pulse source 1143. For example, the pre-pulse source 1143 can be any rare-earth-doped solid state laser other that an Nd:YAG, such as an erbium-doped fiber (Er:glass) laser. In another example, the pre-pulse source can be a carbon dioxide laser that produces pulses having a wavelength of 10.6 μm. The pre-pulse source 1143 can be any other radiation or light source that produces light pulses that have an energy and wavelength used for the pre-pulses discussed above.

The optical element 1122 directs the amplified light beam 1110 and the pulses of radiation 1117 from the pre-pulse source 1143 to the chamber 1140. The optical element 1122 is any element that can direct the amplified light beam 1110 and the pulses of radiation 1117 along similar or the same paths. In the example shown in FIG. 11, the optical element 1122 is a dichroic beamsplitter that receives the amplified light beam 1110 and reflects it toward the chamber 1140. The optical element 1122 receives the pulses of radiation 1117 and transmits the pulses toward the chamber 1140. The dichroic beamsplitter has a coating that reflects the wavelength(s) of the amplified light beam 1110 and transmits the wavelength(s) of the pulses of radiation 1117. The dichroic beamsplitter can be made of, for example, diamond.

In other implementations, the optical element 1122 is a mirror that defines an aperture (not shown). In this implementation, the amplified light beam 1110 is reflected from the mirror surface and directed toward the chamber 1140, and the pulses of radiation pass through the aperture and propagate toward the chamber 1140.

In still other implementations, a wedge-shaped optic (for example, a prism) can be used to separate the amplified light beam 1110 and the pre-pulse 1117 into different angles, according to their wavelengths. The wedge-shaped optic can be used in addition to the optical element 1122, or it can be used as the optical element 1122. The wedge-shaped optic can be positioned just upstream (in the "–z" direction) of the focusing assembly 1142.

Additionally, the pulses 1117 can be delivered to the chamber 1140 in other ways. For example, the pulses 1117 can travel through optical fibers that deliver the pulses 1117 to the chamber 1140 and/or the focusing assembly 1142 without the use of the optical element 1122 or other directing elements. In these implementations, the fibers bring the pulses of radiation 1117 directly to an interior of the chamber 1140 through an opening formed in a wall of the chamber 1140.

The amplified light beam 1110 is reflected from the optical element 1122 and propagates through the focusing assembly 1142. The focusing assembly 1142 focuses the amplified light beam 1110 at a focal plane 1146, which may or may not coincide with a target location 1130. The pulses of radiation 1117 pass through the optical element 1122 and are directed through the focusing assembly 1142 to the chamber 1140. The amplified light beam 1110 and the pulses of radiation 1117, are directed to different locations along the "x" direction in the chamber 1140 and arrive in the chamber 1140 at different times.

In the example shown in FIG. 11, a single block represents the pre-pulse source 1143. However, the pre-pulse source 1143 can be a single light source or a plurality of light sources. For example, two separate sources can be used to generate a plurality of pre-pulses (such as the pre-pulses 906 and 907 of FIGS. 9A-9C). The two separate sources can be different types of sources that produce pulses of radiation having different wavelengths and energies. For example, one of the pre-pulses can have a wavelength of 10.6 μm and be generated by a $CO_2$ laser, and the other pre-pulse can have a wavelength of 1.06 μm and be generated by a rare-earth-doped solid state laser.

In some implementations, the pre-pulses 1117 and the amplified light beam 1110 can be generated by the same source. For example, the pre-pulse of radiation 1117 can be generated by the drive laser system 1105. In this example, the drive laser system can include two $CO_2$ seed laser subsystems and one amplifier. One of the seed laser subsystems can produce an amplified light beam having a wavelength of 10.26 μm, and the other seed laser subsystem can produce an amplified light beam having a wavelength of 10.59 μm. These two wavelengths can come from different lines of the $CO_2$ laser. In other examples, other lines of the $CO_2$ laser can be used to generate the two amplified light beams. Both amplified light beams from the two seed laser subsystems are amplified in the same power amplifier chain and then angularly dispersed to reach different locations within the chamber 1140. The amplified light beam with the wavelength of 10.26 μm can be used as the pre-pulse 1117, and the amplified light beam with the wavelength of 10.59 μm can be used as the amplified light beam 1110. In implementations that employ a plurality of pre-pulses, such as the example of FIGS. 9A-9C, three seed lasers can be used, one of which is used to generate each of the amplified light beam 1110, a first pre-pulse, and a second, separate pre-pulse.

The amplified light beam 1110 and the pre-pulse of radiation 1117 can all be amplified in the same optical amplifier. For example, the three or more power amplifiers can be used to amplify the amplified light beam 1110 and the pre-pulse 1117.

Referring to FIG. 12, in some implementations, the extreme ultraviolet light system 100 is a part of a system that includes other components, such as a vacuum chamber 1200, one or more controllers 1280, one or more actuation systems 1281, and a guide laser 1282.

The vacuum chamber 1200 can be a single unitary structure or it can be set up with separate sub-chambers that house specific components. The vacuum chamber 1200 is at least a partly rigid enclosure from which air and other gases are removed by a vacuum pump, resulting in a low-pressure environment within the chamber 1200. The walls of the chamber 1200 can be made of any suitable metals or alloys that are suitable for vacuum use (can withstand the lower pressures).

The target material delivery system 115 delivers the target material 120 to the target location 130. The target material 120 at the target location can be in the form of liquid droplets, a liquid stream, solid particles or clusters, solid particles contained within liquid droplets or solid particles contained within a liquid stream. The target material 120 can include, for example, water, tin, lithium, xenon, or any material that, when converted to a plasma state, has an emission line in the EUV range. For example, the element tin can be used as pure tin (Sn), as a tin compound, for example, $SnBr_4$, $SnBr_2$, $SnH_4$, as a tin alloy, for example, tin-gallium alloys, tin-indium alloys, tin-indium-gallium alloys, or any combination of these alloys. The target material 120 can include a wire coated with one of the above elements, such as tin. If the target material 120 is in a solid state, it can have any suitable shape, such as a ring, a sphere, or a cube. The target material 120 can be delivered by the target material delivery system 115 into the interior of the chamber 1200 and to the target location 130. The target location 130 is also referred to as an irradiation site, the place where the target material 120 optically interacts with the amplified light beam 110 to produce the plasma.

The drive laser system 105 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the drive laser system 105 produces the amplified light beam 110 due to the population inversion in the gain media of the laser amplifiers even if there is no laser cavity. Moreover, the drive laser system 105 can produce an amplified light beam 110 that is a coherent laser beam if there is a laser cavity to provide enough feedback to the drive laser system 105. The term "amplified light beam" encompasses one or more of: light from the drive laser system 105 that is merely amplified but not necessarily a coherent laser oscillation and light from the drive laser system 105 that is amplified and is also a coherent laser oscillation.

The optical amplifiers in the drive laser system 105 can include as a gain medium a filling gas that includes $CO_2$ and can amplify light at a wavelength of between about 9100 and about 11000 nm, and in particular, at about 10600 nm, at a gain greater than or equal to 1000. Suitable amplifiers and lasers for use in the drive laser system 105 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the drive laser system 105 can also include a cooling system such as water that can be used when operating the drive laser system 105 at higher powers.

The light collector 155 can be a collector mirror 1255 having an aperture 1240 to allow the amplified light beam 110 to pass through and reach the focal region 145. The collector mirror 1255 can be, for example, an ellipsoidal mirror that has a first focus at the target location 130 or the focal region 145, and a second focus at an intermediate location 1261 (also called an intermediate focus) where the EUV light 160 can be output from the extreme ultraviolet light system and can be input to the optical apparatus 165.

The one or more controllers 1280 are connected to the one or more actuation systems or diagnostic systems, such as, for example, a droplet position detection feedback system, a laser control system, and a beam control system, and one or more target or droplet imagers. The target imagers provide an output indicative of the position of a droplet, for example, relative to the target location 130 and provide this output to the droplet position detection feedback system, which can, for example, compute a droplet position and trajectory from which a droplet position error can be computed either on a droplet by droplet basis or on average. The droplet position detection feedback system thus provides the droplet position error as an input to the controller 1280. The controller 1280 can therefore provide a laser position, direction, and timing correction signal, for example, to the laser control system that can be used, for example, to control the laser timing circuit and/or to the beam control system to control an amplified light beam position and shaping of the beam transport system to change the location and/or focal power of the beam focal spot within the chamber 1200.

The target material delivery system 115 includes a target material delivery control system that is operable in response to a signal from the controller 1280, for example, to modify the release point of the droplets as released by an internal delivery mechanism to correct for errors in the droplets arriving at the desired target location 130.

Additionally, the extreme ultraviolet light system can include a light source detector that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector generates a feedback signal for use by the controller 1280. The feedback signal can be, for example, indicative of the errors in parameters such as the timing and focus of the laser pulses to properly intercept the droplets in the right place and time for effective and efficient EUV light production.

In some implementations, the drive laser system 105 has a master oscillator/power amplifier (MOPA) configuration with multiple stages of amplification and having a seed pulse that is initiated by a Q-switched master oscillator (MO) with low energy and high repetition rate, for example, capable of 100 kHz operation. From the MO, the laser pulse can be amplified, for example, using RF pumped, fast axial flow, $CO_2$ amplifiers to produce the amplified light beam 110 traveling along a beam path.

Although three optical amplifiers can be used, it is possible that as few as one amplifier and more than three amplifiers could be used in this implementation. In some implementations, each of the $CO_2$ amplifiers can be an RF pumped axial flow $CO_2$ laser cube having a 10 meter amplifier length that is folded by internal mirrors.

At the irradiation site, the amplified light beam 110, is used to create plasma having certain characteristics that depend on the composition of the target material 120. These characteristics can include the wavelength of the EUV light 160 produced by the plasma and the type and amount of debris released from the plasma. The amplified light beam 110 evaporates the target material 120, and heats the vaporized target material to a critical temperature at which electrons are shed (a plasma state), leaving behind ions, which are further heated until they start emitting photons having a wavelength in the extreme ultraviolet range.

A number of implementations have been described. However, other implementations are within the scope of the following claims.

Although illustrated as a linear path, the beam path 309 (FIG. 3A) can take any form. Additionally, the optical source 305 can include other components, such as lenses and/or mirrors, to steer light along the path 309. The optical amplifier 306 (FIG. 3A) is shown as a single stage, however, in other implementations, the optical amplifier 306 can be a chain of a plurality of amplifiers. The chain of amplifiers can include one or more pre-amplifiers and one or more stages of power amplifiers.

What is claimed is:

1. A method comprising:
   directing an optical pulse toward an optical element;
   controlling the optical element to form a modified optical pulse from the optical pulse, the modified optical pulse comprising a first portion and a second portion, the second portion having a temporal energy profile based on a temporal energy profile of the optical pulse, and the first portion having a temporal profile that is different from the temporal energy profile of the optical pulse, wherein one or more characteristics of the modified optical pulse are at least partially determined by controlling the optical element; and
   interacting the modified optical pulse with a target comprising target material, wherein an interaction between the second portion of the modified optical pulse and the target converts at least some of the target material to a plasma that emits extreme ultraviolet (EUV) light.

2. The method of claim 1, wherein the one or more characteristics of the modified optical pulse comprise a temporal duration, a peak energy, and/or the temporal energy profile of the first portion of the modified optical pulse.

3. The method of claim 2, wherein the target is a modified target, and further comprising interacting a pre-pulse optical pulse with an initial target to form the modified target.

4. The method of claim 3, wherein the modified target has a first extent along a first direction, the first direction being parallel to a direction of propagation of the second portion of the modified optical pulse, the one or more characteristics of the modified optical pulse comprise a temporal duration, and controlling the optical element to form the modified optical pulse comprises controlling the temporal duration of the second portion of the modified optical pulse based on the first extent of the modified target.

5. The method of claim 4, wherein the temporal duration of the second portion of the modified target is inversely related to the first extent of the modified target.

6. The method of claim 1, wherein interacting the first portion of the modified optical pulse with the target comprising target material modifies a geometric distribution of the target material in at least two dimensions.

7. The method of claim 6, wherein the geometric distribution of the target material increases in at least one of the at least two dimensions.

8. The method of claim 1, wherein an interaction between the first portion of the modified optical pulse and the target modifies a geometric distribution of the target material to form a modified target, the modified target occupying a larger volume than the target, the modified target comprising at least a region that has a lower density than the target, and the second portion of the modified optical pulse interacts with the modified target to form the plasma that emits EUV light.

9. The method of claim 1, wherein controlling an optical element comprises applying a voltage to an electro-optic modulator (EOM).

10. A system for an extreme ultraviolet (EUV) light source, the system comprising:
a light generation module;
an optical element; and
a control system configured to determine one or more characteristics of a modified optical pulse formed from an optical pulse produced by the light generation module, wherein the modified optical pulse comprises a first portion and a second portion, the second portion has a temporal energy profile based on a temporal energy profile of the optical pulse, the first portion has a temporal profile that is different from the temporal energy profile of the optical pulse, and the second portion has an energy sufficient to convert at least some target material in a target to a plasma that emits EUV light.

11. The EUV light source of claim 10, wherein the optical element comprises an electro-optic modulator (EOM).

12. The EUV light source of claim 10, further comprising a second light generation module, the second light generation module being configured to emit a second optical pulse.

13. The EUV light source of claim 12, further comprising a beam combiner configured to interact with the modified optical pulse and the second optical pulse, and to direct the modified optical pulse and the second optical pulse to a vessel configured to receive a target.

14. The EUV light source of claim 13, wherein the light generation module comprises a carbon dioxide (CO2) laser, and the second light generation module comprises a solid state laser.

15. The EUV light source of claim 14, wherein the modified optical pulse comprises light having a wavelength of 10.6 microns (µm), and the second optical pulse comprises light having a wavelength of 1.06 µm.

16. The EUV light source of claim 12, wherein the modified optical pulse comprises light having 10.6 microns (µm), and the second optical pulse comprises light having a wavelength of 10.6 µm.

17. The EUV light source of claim 16, wherein the light generation module and the second light generation module are part of a single light source.

18. The EUV light source of claim 16, wherein the light generation module and the second light generation module are distinct and separate light sources.

19. An EUV light source comprising:
a light generation module;
an optical element;
a vessel configured to receive a target comprising target material that emits EUV light when in a plasma state; and
a control system configured to determine one or more characteristics of a modified optical pulse formed by the optical element based on an optical pulse produced by the light generation module, wherein the modified optical pulse comprises a first portion and a second portion, the second portion has a temporal energy profile based on a temporal energy profile of the optical pulse, the first portion has a temporal profile that is different from the temporal energy profile of the optical pulse, and the second portion has an energy sufficient to convert at least some target material in a target to a plasma that emits EUV light.

20. An EUV light source comprising:
a light generation module configured to emit an optical pulse;
an optical element configured to form a main pulse of light from the optical pulse, the main pulse of light being a single pulse of radiation having a first portion and a second portion, the second portion having a temporal energy profile that is based on a temporal energy profile of the optical pulse, and the first portion having a temporal energy profile that is different from the temporal energy profile of the optical pulse; and
a vessel comprising a target region configured to receive a target, wherein the target comprises target material that emits EUV light when in a plasma state, and the target has an extent in a first direction of 200 nanometers (nm) or less and an extent in a second direction of 300 micrometers (µm) or more.

21. The EUV light source of claim 20, further comprising:
a control system configured to control the optical element to determine one or more characteristics of the main pulse of light.

22. The EUV light source of claim 20, further comprising:
a target material supply system configured to supply the target to the vessel.

23. The EUV light source of claim 22, wherein the target material supply system is configured to supply a droplet of molten metal to the vessel, and the EUV light source further comprises:
a second light generation module configured to emit an initial pulse of light, the initial pulse of light being configured to interact with the droplet of molten metal to form the target prior to the target being received in the target region.

24. The EUV light source of claim 23, wherein the drop of molten metal is 17-35 μm in diameter.

* * * * *